United States Patent
Anand et al.

(10) Patent No.: US 9,553,858 B2
(45) Date of Patent: Jan. 24, 2017

(54) HARDWARE-BASED CREDENTIAL DISTRIBUTION

(71) Applicant: Microsoft Technology Licensing, LLC, Redmond, WA (US)

(72) Inventors: Gaurav S. Anand, Seattle, WA (US); Kevin Michael Woley, Seattle, WA (US); Matthew R. Ayers, Seattle, WA (US); Rajeev Dutt, Redmond, WA (US); Eric Fleischman, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/064,004

(22) Filed: Oct. 25, 2013

(65) Prior Publication Data
US 2014/0059664 A1   Feb. 27, 2014

Related U.S. Application Data

(63) Continuation of application No. 12/949,589, filed on Nov. 18, 2010, now Pat. No. 8,572,699.

(51) Int. Cl.
*H04L 9/32* (2006.01)
*H04L 29/06* (2006.01)
*H04L 29/08* (2006.01)
*G06F 21/31* (2013.01)

(52) U.S. Cl.
CPC ........... *H04L 63/08* (2013.01); *H04L 63/0823* (2013.01); *H04L 67/303* (2013.01); *G06F 21/31* (2013.01)

(58) Field of Classification Search
CPC .... H04L 63/08; H04L 63/0823; H04L 63/083; H04L 67/303; H04L 29/08927; H04L 9/3263; H04L 12/5695; H04L 47/822; H04L 47/828; G06F 21/6218
USPC .................. 726/5, 6; 709/206; 713/156, 168
See application file for complete search history.

(56) References Cited

U.S. PATENT DOCUMENTS

| | | | |
|---|---|---|---|
| 5,560,008 A | | 9/1996 | Johnson et al. |
| 6,118,791 A | * | 9/2000 | Fichou .................... H04L 45/02 370/230 |
| 6,226,743 B1 | * | 5/2001 | Naor et al. .................... 713/177 |
| 6,233,341 B1 | * | 5/2001 | Riggins .................. H04L 63/06 380/277 |

(Continued)

FOREIGN PATENT DOCUMENTS

| CN | 1818919 | | 8/2006 |
|---|---|---|---|
| CN | 1818919 A | * | 8/2006 |

(Continued)

OTHER PUBLICATIONS

"Why is Kerberos a credible security solution", MIT Kerberos consortium, 2008, 13 pages.*

(Continued)

*Primary Examiner* — Luu Pham
*Assistant Examiner* — Walter Malinowski
(74) *Attorney, Agent, or Firm* — Bryan Webster; Dan Choi; Micky Minhas (57) ABSTRACT

This document describes various techniques for distributing credentials based on hardware profiles. A resource access request including a hardware profile is transmitted to a remote entity having access to a previous hardware profile and a credential useful to access a resource is received if at least a portion of the hardware profile matches the previous hardware profile.

20 Claims, 5 Drawing Sheets

(56) References Cited

U.S. PATENT DOCUMENTS

| | | | |
|---|---|---|---|
| 7,106,756 B1* | 9/2006 | Donovan | H04L 12/5695 370/395.21 |
| 7,178,025 B2 | 2/2007 | Scheidt et al. | |
| 8,572,699 B2 | 10/2013 | Anand et al. | |
| 8,615,653 B2* | 12/2013 | Thayer | H04L 9/3268 713/155 |
| 8,675,876 B2* | 3/2014 | Yamamoto et al. | 380/278 |
| 2002/0031089 A1* | 3/2002 | Elloumi | H04L 47/10 370/235 |
| 2003/0014665 A1 | 1/2003 | Anderson et al. | |
| 2003/0131096 A1* | 7/2003 | Goringe et al. | 709/224 |
| 2004/0236948 A1* | 11/2004 | McKeon | H04L 9/3234 713/175 |
| 2005/0157723 A1* | 7/2005 | Kim | H04L 47/215 370/392 |
| 2005/0181765 A1 | 8/2005 | Mark | |
| 2005/0188052 A1* | 8/2005 | Ewanchuk et al. | 709/217 |
| 2005/0235358 A1* | 10/2005 | Keohane et al. | 726/23 |
| 2006/0048228 A1* | 3/2006 | Takemori | G06F 21/577 726/22 |
| 2006/0075042 A1* | 4/2006 | Wang | H04L 67/02 709/206 |
| 2006/0101507 A1* | 5/2006 | Camenisch | 726/5 |
| 2006/0143685 A1* | 6/2006 | Vasishth et al. | 726/1 |
| 2006/0165060 A1 | 7/2006 | Dua | |
| 2006/0212407 A1* | 9/2006 | Lyon | G06Q 20/04 705/71 |
| 2006/0224901 A1* | 10/2006 | Lowe | H04L 63/062 713/186 |
| 2007/0076871 A1 | 4/2007 | Renes | |
| 2007/0165859 A1 | 7/2007 | Scheidt et al. | |
| 2007/0209071 A1 | 9/2007 | Weis et al. | |
| 2008/0046434 A1* | 2/2008 | Nelson | 707/9 |
| 2008/0141350 A1 | 6/2008 | Merkin et al. | |
| 2008/0155668 A1 | 6/2008 | Arashin et al. | |
| 2008/0215363 A1 | 9/2008 | Kasprisin et al. | |
| 2009/0063665 A1 | 3/2009 | Bagepalli et al. | |
| 2009/0109941 A1 | 4/2009 | Carter | |
| 2009/0135817 A1 | 5/2009 | Hulusi et al. | |
| 2009/0260065 A1* | 10/2009 | Kailash | H04L 63/083 726/5 |
| 2009/0307326 A1* | 12/2009 | Landsman et al. | 709/206 |
| 2009/0313337 A1 | 12/2009 | Jin et al. | |
| 2010/0039220 A1 | 2/2010 | Davis | |
| 2010/0082513 A1 | 4/2010 | Liu | |
| 2010/0115268 A1 | 5/2010 | Kudo | |
| 2010/0145900 A1* | 6/2010 | Zheng | G06N 7/005 706/52 |
| 2010/0241851 A1* | 9/2010 | Truskovsky | H04L 63/0823 713/156 |
| 2010/0318800 A1 | 12/2010 | Simon et al. | |
| 2011/0083190 A1* | 4/2011 | Brown et al. | 726/26 |
| 2011/0113242 A1* | 5/2011 | McCormack | 713/165 |
| 2011/0154462 A1* | 6/2011 | Charbonnier et al. | 726/7 |
| 2011/0161663 A1* | 6/2011 | Nakhjiri | 713/158 |
| 2012/0089682 A1* | 4/2012 | Wu | H04W 28/24 709/206 |
| 2012/0131652 A1 | 5/2012 | Anand | |

FOREIGN PATENT DOCUMENTS

| | | |
|---|---|---|
| CN | 102438013 | 5/2012 |
| JP | 2000032048 | 1/2000 |
| JP | 2007164806 | 6/2007 |
| WO | WO-2004047407 | 6/2004 |

OTHER PUBLICATIONS

Raghavan, "Cloud Control with Distributed Rate Limiting", SIGCOMM'07, Aug. 27-31, 2007, Kyoto, Japan, 12 pages.*

Bottoni, "Credentials and Beliefs in Remote Trusted Platforms Attestation", Proceedings of the 2006 International Symposium on a World of Wireless, Mobile and Multimedia, 2006, IEEE, 6 pages.*

Fouladgar, "Scalable Privacy Protecting Scheme through Distributed RFID Tag Identification", AIPAC, Sep. 22, 2008, Istanbul, 8 pages.*

"Foreign Office Action", CN Application No. 201110367796.0, Feb. 7, 2014, 14 Pages.

"Description of Windows Genuine Advantage (WGA)", Retrieved from: <http://support.microsoft.com/kb/892130> on Sep. 24, 2010, (Sep. 14, 2010), 3 pages.

"Final Office Action", U.S. Appl. No. 12/949,589, (Jan. 30, 2013), 21 pages.

"Non-Final Office Action", U.S. Appl. No. 12/949,589, (Aug. 9, 2012), 12 pages.

"Notice of Allowance", U.S. Appl. No. 12/949,589, (Jun. 25, 2013), 8 pages.

"Technique for Improving Performance of Global Serialization", NN9302123, IBM Technical Disclosure Bulleting, Feb. 1993, vol. 36, issue No. 2,(Feb. 1993), 2 pages.

Fogie, Seth "Security Reference Guide", Retrieved from: <http://www.informit.com/guides/content.aspx?g=security&seqNum=218> on Sep. 24, 2010, (Sep. 8, 2006), 2 pages.

Hines, Matt "Microsoft WGA Attracts Copycat Worm and Second Lawsuit", Retrieved from: <http://www.eweek.com/c/a/Security/Microsoft-WGA-Attracts-Copycat-Worm-and-Second-Lawsuit/> on Sep. 24, 2010, (Jul. 5, 2006), 3 pages.

Shinder, Thomas "Prevent Denial of Service Attacks with Lockout Guard", Retrieved from: <http://www.isaserver.org/tutorials/Prevent-Denial-Service-Attacks-Lockout-Guard.html> on Sep. 24, 2010, (Apr. 15, 2008), 28 pages.

Son, Ju-Hyung et al., "Denial of Service Attack-Resistant Flooding Authentication in Wireless Sensor Networks", Retrieved from: <http://portal.acm.org/citation.cfm?id=1833995> on Sep. 24, 2010, Computer Communications, vol. 33, Issue 13, (Abstract), (Aug. 2010), 4 pages.

"Foreign Office Action", CN Application No. 201110367796.0, Oct. 24, 2014, 11 Pages.

"Foreign Office Action", CN Application No. 201110367796.0, Apr. 10, 2015, 15 Pages.

"Foreign Office Action", CN Application No. 201110367796.0, Oct. 10, 2015, 14 Pages.

"Foreign Office Action", CN Application No. 201110367796.0, Apr. 11, 2016, 10 Pages.

* cited by examiner

HARDWARE-BASED CREDENTIAL DISTRIBUTION

PRIORITY APPLICATION

This application is a continuation of and claims priority to U.S. patent application Ser. No. 12/949,589 filed Nov. 18, 2010, entitled "Hardware-Based Credential Distribution", the disclosure of which is incorporated by reference herein in its entirety.

BACKGROUND

Credentials allow a service to authenticate a client before providing resources or sharing data with the client. Services usually distribute verifiable credentials to clients to allow the client to access the resources or data over a network. Credentials are not infinite, however, and should only be distributed to actual users of the service. Arbitrary distribution of credentials can result in exploitation or interruptions of services, such as denial of service attacks by malicious entities.

To limit distribution of credentials many services rely on human-verification methods. These human-verification methods use logins, passwords, and/or challenge response tests to verify the client's identity when a service is accessed. While these human-verification methods help to limit credential distribution to clients associated with human users, they compromise a user's computing experience.

SUMMARY

This document describes various techniques for distributing credentials based on hardware profiles. These techniques may validate a request for a resource by matching a hardware profile of the requesting entity to a previous hardware profile associated with that requesting entity. Once validated, the techniques distribute a credential for accessing the resource. By so doing, the techniques protect the resource from exploitation or attack without compromising a user's computing experience.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various techniques for distributing credentials based on hardware profiles. These techniques can improve a user's computing experience by forgoing a login, password, and/or response challenge, though these techniques can be used in conjunction with human-verification methods for additional security.

EXAMPLE ENVIRONMENT

Figure 1:
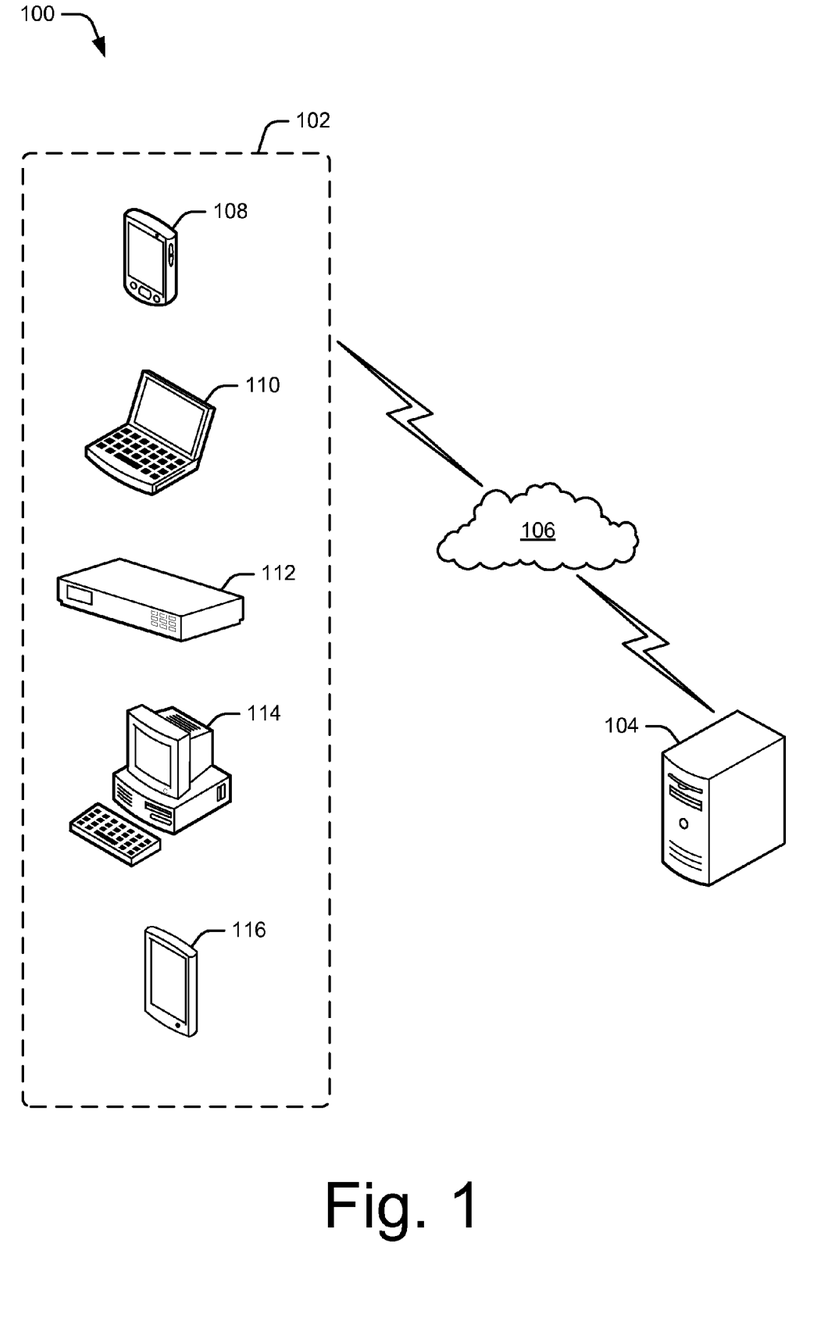
FIG. 1 illustrates an example environment in which these techniques may be performed.

FIG. 1 is an illustration of an example environment 100 having a computing device 102, server 104, and communication network 106, through which computing device 102 and server 104 may communicate. Generally, computing device 102 requests access to a resource of server 104 through communication network 106. In some embodiments, a secure communication channel is established between computing device 102 and server 104 over communication network 106 for providing resources and/or exchanging trusted data.

Computing device 102 can be any device capable of communicating over a network (e.g., communication network 106), accessing resources of a service, and exchanging trusted data. Computing device 102 is illustrated, by way of example and not limitation, as one of a smartphone 108, a laptop computer 110, set-top box 112, desktop computer 114, or tablet computer 116. Communication network 106 may include any suitable network such as the Internet, a local-area network, a wide-area network, a wireless-network, a personal-area network, a dial-up network, and/or a USB bus, to name a few.

Server 104 can be any computing device having resources and/or hosting a service for managing the resources, such as objects, data, functionalities, and the like. The service of server 104 requires authentication of a client before sharing a resource with the client requesting access to the resource. In some cases, authentication may be direct with computing device 102 or brokered through a third party associated with both server 104 and computing device 102 (not shown). A resource of server 104 is typically referenced by a Uniform Resource Locator (URL) or Universal Resource Identifier (URI). A URL or URI is used by a client, such as computing device 102, for initiating access of the resource. In other cases, a resource may be referenced by an abstract domain in extensible markup language (XML) such as a namespace.

Figure 2:
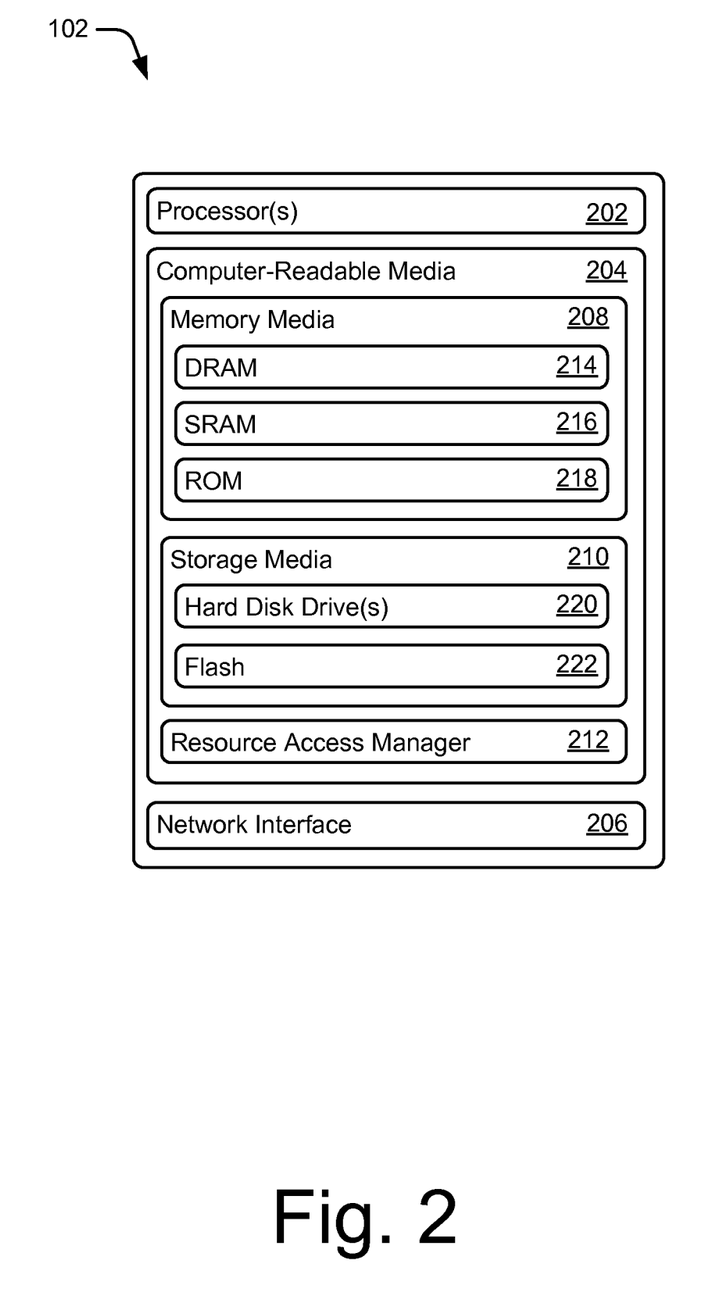
FIG. 2 illustrates an example computing device of FIG. 1 in more detail.

FIG. 2 illustrates an example computing device 102 of FIG. 1 in more detail. Computing device 102 includes processor(s) 202, computer-readable media (CRM) 204, and network interface 206. Network interface 206 allows computing device 102 to communicate over communication network 106 and may include a unique media access control (MAC) address (not shown). Computer-readable media 204 contains memory media 208, storage media 210, and resource access manager 212, which is described as part of the processes discussed below.

Memory media 208 can include dynamic random access memory (DRAM) 214, static random access memory (SRAM) 216, read-only memory (ROM) 218, or any combination thereof. Memory media 208 may be fixed or modular (flexibly configured) providing various configurations and/or capacities of memory for computing device 102. For instance, DRAM 214 may be user accessible, allowing a user to increase an amount of DRAM 214 present in computing device 102. Alternately or additionally, memory media 208 may include information relating a manufacturer, data rate, and/or capacity of memory device(s) of computing device 102. In some instances, DRAM 214 includes a serial presence detect integrated circuit (not shown) presenting information relating to a data rate and capacity of DRAM 214.

Storage media 210 can include hard disk drive (HDD) 220 and/or flash 222. Storage media 210 is internal and/or external (but local) computer-readable storage media and is capable of storing data. Hard disk drive 220 or flash 222 can be configured as individual storage volumes or as multiple drives of a redundant array of independent disks (RAID) volume. Alternately or additionally, storage media 210 can include information relating to a manufacturer, model number, serial number, and/or a capacity of a particular storage media device. For instance, hard disk drive 220 may include a model number, serial number, and capacity information detectable by a host device or a component of a host device.

Generally, any of the techniques and abilities described herein can be implemented using software, firmware, hardware (e.g., fixed-logic circuitry), manual processing, or any suitable combination of these implementations. The example computing device 102 generally represents software, firmware, hardware, or any combination thereof. In the case of a software implementation, for instance, resource access manager 212 represents computer-executable instructions (e.g., program code) that perform specific tasks when executed on a processor (e.g., CPU or CPUs). The program code can be stored in one or more computer-readable media devices, such as memory media 208 and/or storage media 210. The features and techniques described herein are platform-independent, meaning that they may be implemented on a variety of commercial computing platforms having a variety of processors.

Example Processes

The following discussion describes techniques for distributing credentials based on hardware profiles. These techniques can be used instead of or in addition to human-verification methods. When used in addition to human-verification methods, these techniques provide additional security for credential distribution. When used instead of human-verification methods, these techniques forgo often-annoying or time-consuming user-dependent activities.

By way of example, assume computing device 102 transmits a resource access request including a unique identifier and a current hardware profile to server 104 over communication network 106. Server 104 receives the unique identifier and hardware profile, determines whether or not the hardware profile matches at least a portion of a stored hardware profile associated with the unique identifier, and, if it matches, sends a credential useful to access a resource to computing device 102.

Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 as well as entities of environment 100 illustrated in FIG. 2.

Figure 3:
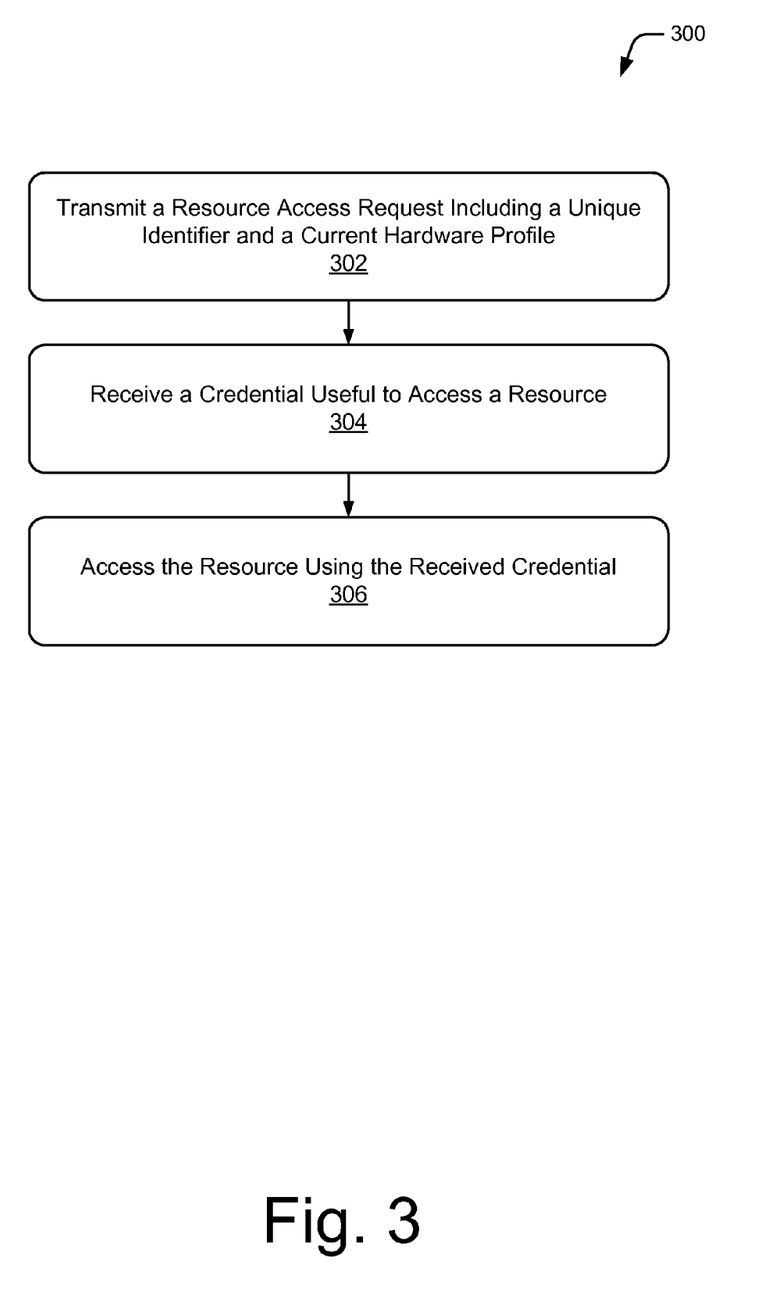
FIG. 3 is a flow diagram depicting an example process for accessing a resource with a credential distributed based on a hardware profile.

FIG. 3 is a flow diagram depicting an example process 300 for accessing a resource with a credential distributed based on hardware profiles. Block 302 transmits a resource access request including a unique identifier and a current hardware profile to a remote entity. In some cases, the resource access request is just the unique identifier and the current hardware profile. The remote entity has access (locally, remotely, or via proxy) to a previous hardware profile associated with the unique identifier. In some instances, the unique identifier is associated with the previous hardware profile during a past attempt to access a resource or during a secure registration process.

The current hardware profile includes information relating to hardware components or a hardware configuration of a computing device. This profile can be generated by an application programming interface (API) based on information relating to hardware of a computing device, such as serial numbers, model numbers, and/or parameters of hardware components of the computing device.

The unique identifier is any certificate, token, identification data, or combination thereof that uniquely identifies a computing device. In some cases, the unique identifier is digitally signed or encrypted with a private key and/or shared key to ensure authenticity. This unique identifier may be received during a secure registration process that associates the unique identifier with a hardware profile. For instance, the unique identifier may be a software license validation (SLV) certificate received during secure registration with an SLV server. During this secure registration, a hardware profile sent to the SLV server is associated with the SLV certificate.

By way of example, consider process 300 in the context of environment 100. Resource access manager 212 generates a current hardware profile of laptop computer 110 based on information relating to DRAM 214, HDD 220, and Network Interface 206. This current hardware profile includes information relating to a manufacturer and a capacity (or amount) of DRAM 214, a serial number and model number of HDD 220, and a MAC address of network interface 206.

Here assume that resource access manager 212 is attempting to access a software update of server 104. To do so, resource access manager 212 transmits a resource access request including a unique identifier and the current hardware profile to server 104 over communication network 106.

Block 304 receives a credential useful to access a resource from the remote entity if the current hardware profile matches at least a portion of the previous hardware profile. The credential is useful to access a resource directly or access a service managing resources, functionalities, and/or data. In the context of the present example, assume that the manufacturer and capacity (or amount) of DRAM 214 and the MAC address of network interface 206 of the current hardware profile match corresponding information of a previous hardware profile associated with the certificate. Resource access manager 212 receives, from server 104, a credential useful to access the software update resource responsive to a portion of the current hardware profile matches the previous hardware profile.

Optionally, at block 306, a resource is accessed using the received credential. The resource may be accessed directly or through a service managing the resource and/or data. In some cases, the resource is a functionality provided by the service, such as messaging, synchronizing data, or trusted data exchange. Concluding the present example, resource access manager 212 accesses the software update resource of server 104 using the received credential and downloads a software update over communication network 106.

Figure 4:
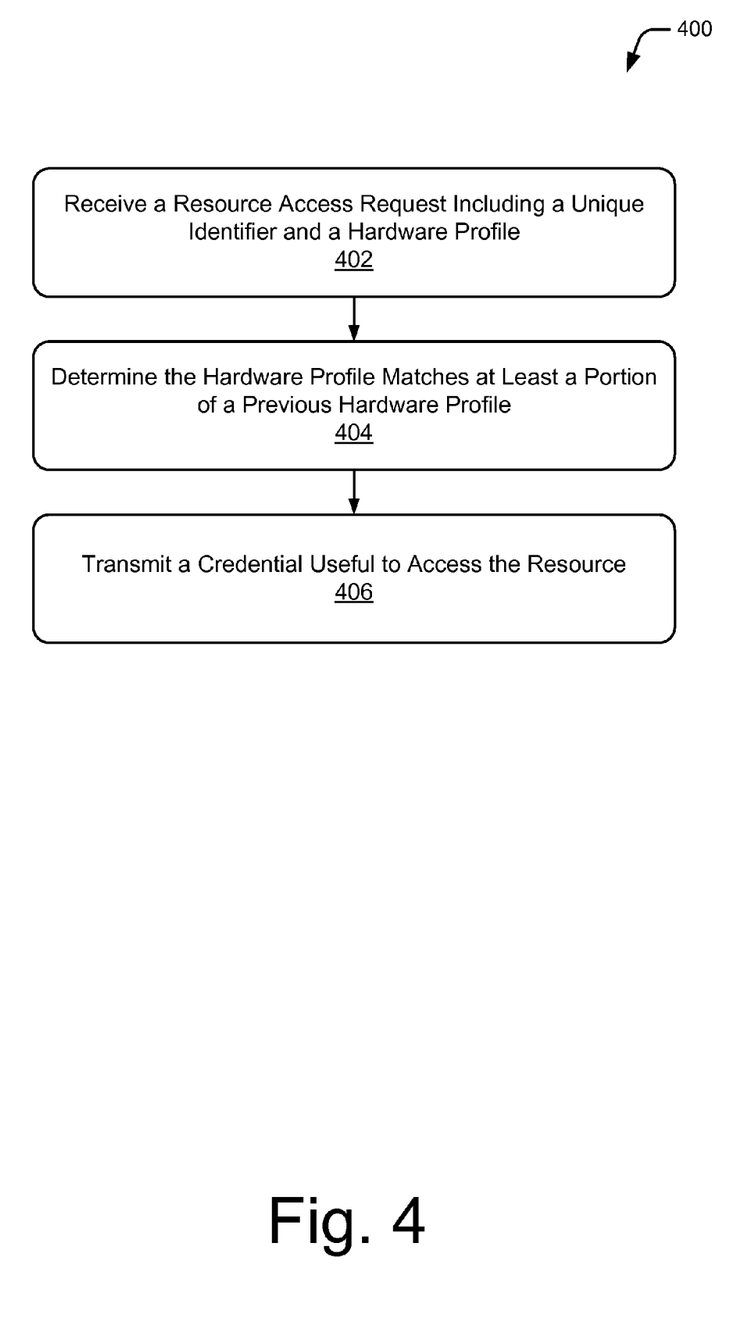
FIG. 4 is a flow diagram depicting an example process for distributing a credential based on a hardware profile.

FIG. 4 is a flow diagram depicting an example process 400 for distributing a credential useful to access a resource based on hardware profiles. Block 402 receives a resource access request including a unique identifier and a hardware profile. The unique identifier may be any of those noted above, such as a certificate, token, or identification data or combination thereof that uniquely identifies a remote entity. In some cases, the unique identifier is digitally signed or encrypted with a private key unknown to the remote entity to prevent tampering and/or alteration of the unique identifier. For instance, the unique identifier may be an SLV certificate encrypted with a private key known to an SLV server which issued the certificate.

The hardware profile contains information relating to the remote entity's hardware, such as a collection of serial numbers, model numbers, and/or parameters of hardware components. For instance, the hardware profile can include information about a manufacturer, model number, serial number and a capacity of a hard disk drive.

Consider process 400 in the context of the above-mentioned example. Here server 104 receives a resource access request from resource access manager 212 of laptop computer 110 through data communication network 106. The resource access request includes a hardware profile of laptop computer 110 and a unique identifier in the form of certificate encrypted with a private key known to server 104. The hardware profile of laptop computer 110 includes information relating to a manufacturer and a capacity (or amount) of DRAM 214, a serial number and model number of HDD 220, and a MAC address of network interface 206.

Block 404 determines that the hardware profile matches at least a portion of a stored hardware profile associated with the unique identifier. The stored hardware profile may be stored during a secure registration or license validation process. For instance, a hardware profile received during an SLV process may be stored and associated with an SLV certificate.

In some cases, all of the information contained in the hardware profile matches the information contained in the stored hardware profile associated with the unique identifier. In other cases, where only a portion of the hardware profile matches the stored hardware profile, fuzzy-logic may be employed to determine that the hardware profile sufficiently, but not entirely, matches the stored hardware profile.

A match can be determined using fuzzy-logic even though information relating to a HDD of the hardware profile does not match information relating to a HDD of the stored hardware profile. A matching algorithm employing fuzzy-logic provides flexible matching, allowing a match to be determined for a computing device that has new and/or different hardware components due to repairs and/or upgrades.

This matching algorithm, for example, may determine that the hardware profile is sufficiently similar when two of three hardware component parameters match. The matching algorithm may determine a sufficient match based on various criteria, such as serial numbers that are unlikely to change, while other non-matching serial numbers are acceptable for hardware often altered or replaced, such as external hard drives or non-integrated displays, but not motherboards or processors.

Continuing the ongoing example, server 104 decrypts the certificate using a private key to identify laptop computer 110. Server 104 then determines that at least a portion of the hardware profile of laptop computer 110 matches a stored profile that is associated with the certificate included in the resource access request. Here assume that a user of laptop computer 110 has replaced HDD 220 of laptop computer 110 due to a failure of a previous HDD.

In the context of the present example, a matching algorithm of server 104 employing fuzzy-logic determines that the hardware profile of laptop computer 110 sufficiently matches the stored hardware profile based on the information relating to the manufacturer and the capacity (or amount) of DRAM 214 and the MAC address of network interface 206.

Block 406 transmits a credential to the remote entity useful to access a resource. The credential may be useful to access a resource directly or access a service managing the resource and/or providing functionality related to the resource. In some cases, a credential distribution limit or rule is consulted prior to transmitting the credential limiting distribution of credentials. In some instances, the credential distribution limit is associated with the unique identifier to limit credential distribution to an entity (or entities claiming to be) associated with the unique identifier.

Credential distribution can be limited to a total number of credentials distributed, a rate of credential distribution, or a frequency of credential distribution or any combination thereof. For instance, credential limits associated with a unique identifier may only allow one credential to be distributed every 10 seconds with a total limit of 50 distributed credentials.

Continuing the present example, assume that server 104 has a credential distribution limit of 50 total credentials per unique identifier. Also assume that one credential has been previously issued in association to the certificate included in the resource access request received from laptop computer 110. Here, server 104 consults the credential distribution limit and determines that a credential can be issued to laptop computer 110. Concluding the present example, server 104 increments a credential distribution count associated with the unique identifier and transmits a credential useful to access a software update to laptop computer 110 over communication network 106. This is but one way in which the techniques may limit credential distribution to computing devices of actual users of a service.

Figure 5:
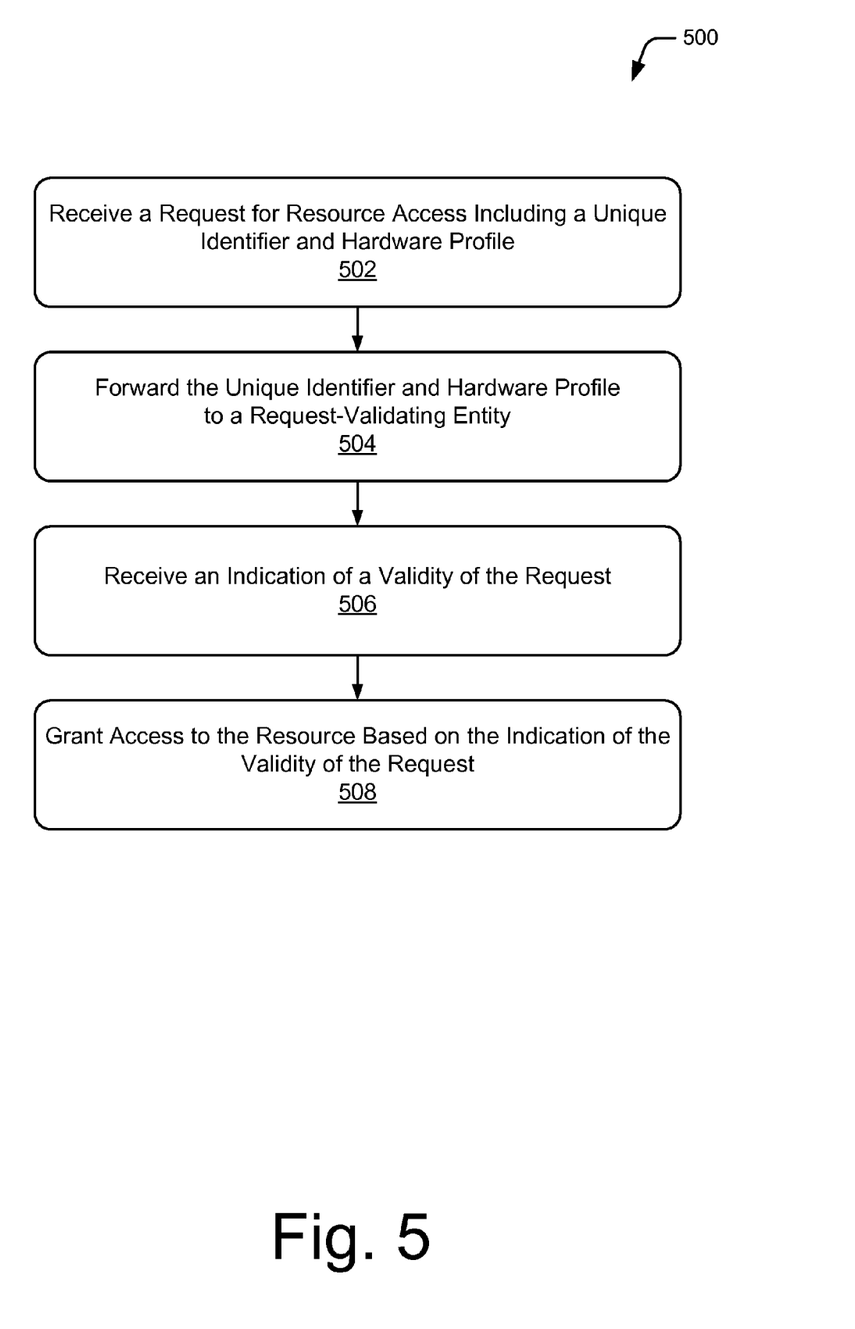
FIG. 5 is a flow diagram depicting an example process for granting access to a resource based on an indication of a validity of a request.

FIG. 5 is a flow diagram depicting an example process 500 for granting access to a resource. Block 502 receives a request for resource access including a unique identifier and a hardware profile, such as those unique identifiers and hardware profiles mentioned above.

Consider process 500 in the context of environment 100. Here server 104 receives a resource access request from resource access manager 212 of laptop computer 110 over communication network 106. Assume that the resource access request includes a certificate encrypted with a private key and a hardware profile of laptop computer 110. Also assume that server 104 is hosting a software update service, and that resource access manager 212 of laptop computer 110 is attempting to access the software update service. In the context of the present example, server 104 does not have a private key for decrypting the certificate included in the resource access request.

Block 504 forwards the unique identifier and hardware profile to a request-validating entity having access to a historical hardware profile associated with the unique identifier. The historical hardware profile includes information previously collected relating to hardware components or a hardware configuration of a computing device. In some cases, the historical hardware profile is received from a computing device during a secure registration process. In such a case, the unique identifier may have been issued to the computing device and associated with the received hardware profile. For instance, the unique identifier and hardware profile may be forwarded to an SLV server having a stored historical profile associated with an SLV ticket encrypted with a private key.

The request-validating entity may also have access to a private and/or shared key useful to decrypt an encrypted unique identifier. In some cases, the request-validating entity decrypts a certificate, token, or digital signature to expose information uniquely identifying a computing device, such as an SLV server having a private key decrypting and verifying an SLV ticket included in the request.

In the context of the present example server 104 forwards the certificate encrypted with the private key and the hardware profile of laptop 110 to a remote request-validation server (not shown). Here, assume that the request-validation server has a private key capable of decrypting the certificate and a historical hardware profile associated with the certificate.

Block 506 receives an indication of a validity of the request if the request-validating entity determines that the hardware profile of the remote entity matches at least a portion of the historical hardware profile. This indication of validity may include identification information relating to the remote entity, such as information identifying the remote entity as an owner of a software product or as a subscriber to a service. For instance, an indication of the validity of the request can be received from an SLV server when at least a portion of the hardware profile of the remote entity matches a historical hardware profile associated with an SLV ticket.

Continuing the present example, server 104 receives an indication of the validity of the request when the request-validation server determines that the hardware profile of laptop computer 110 matches at least a portion of the historical hardware profile associated with the certificate. The indication of the validity of the request also includes identification information that identifies laptop computer 110 as a subscriber of the software update service of server 104.

Block 508 grants access of the resource to the remote entity based on the indication of the validity of the request. In some cases, a credential useful to access the resource is transmitted to the remote entity. The credential is useful to access a resource directly or access a service managing the resource and/or providing functionality related to the resource. Furthermore, access to the resource may be limited or denied based on identification information relating to the remote entity. For example, access may be limited to updates of a particular software product based on information that identifies the remote entity as an owner of that software product.

Concluding the present example, server 104 grants access of the software update service to laptop computer 110 based on the validity of the request. The access granted is limited by server 104 based on the identification information that identifies laptop computer 110 as a subscriber to that service.

CONCLUSION

This document describes various techniques for distributing credentials based on hardware profiles. By so doing, these techniques improve security and/or a computing experience of a user accessing a resource via a service. Credentials useful for accessing a resource can be provided to a user without querying the user for a login, password, and/or response challenge. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a network interface configured to communicate data over a network;
   one or more processors; and
   a memory coupled to the one or more processors and including processor-executable instructions that, responsive to execution by the one or more processors, implement a resource access manager to:
   receive, via the network interface, a resource access request from a remote entity, the resource access request received prior to the remote entity accessing a resource and including a unique identifier of the remote entity and a hardware profile of the remote entity, the unique identifier of the remote entity being generated in association with a secure registration process prior to receiving the resource access request;
   determine that the hardware profile of the resource access request matches at least a portion of a stored hardware profile associated with the unique identifier;
   determine that a frequency of credential distribution associated with the unique identifier of the remote entity does not exceed a credential distribution frequency limit associated with the unique identifier of the remote entity, the credential distribution frequency limit being effective to limit credentials distributed in association with the unique identifier to one credential per one interval of time; and
   transmit, via the network interface and responsive to determining that the credential distribution frequency limit has not been exceeded, a credential to the remote entity useful to access the resource.

2. The system as recited in claim 1, wherein the hardware profile of the remote entity comprises a collection of serial numbers, model numbers, or parameters of hardware components of the remote entity.

3. The system as recited in claim 1, wherein the unique identifier is a certificate that is digitally signed or encrypted with a private key.

4. The system as recited in claim 1, wherein the resource is a service provided by the system or a resource server associated with the system.

5. The system as recited in claim 1, wherein the resource access manager is further implemented to update, responsive to transmitting the credential to the remote entity, the frequency of credential distribution associated with the unique identifier.

6. The system as recited in claim 1, wherein the resource access manager is further implemented to:
   determine that a number of credentials distributed in association with the unique identifier of the remote entity does not exceed a numerical credential distribution limit associated with the unique identifier of the remote entity; and
   transmit, responsive to determining that the numerical credential distribution limit and the credential distribution frequency limit have not been exceeded, the credential to the remote entity.

7. A method comprising:
   receiving, via a network interface, a resource access request from a remote entity, the resource access request received prior to the remote entity accessing a resource and including a unique identifier of the remote entity and a hardware profile of the remote entity, the unique identifier of the remote entity being generated in association with a secure registration process prior to receiving the resource access request;

determining that the hardware profile of the resource access request matches at least a portion of a stored hardware profile associated with the unique identifier;

determining that a frequency of credential distribution associated with the unique identifier of the remote entity does not exceed a credential distribution frequency limit associated with the unique identifier of the remote entity, the credential distribution frequency limit being effective to limit credentials distributed in association with the unique identifier to one credential per one interval of time; and transmitting, via the network interface and responsive to determining that the credential distribution frequency limit has not been exceeded, a credential to the remote entity useful to access the resource.

8. The method as recited in claim 7, wherein the hardware profile of the remote entity includes a collection of serial numbers, model numbers, or parameters of hardware components of the remote entity.

9. The method as recited in claim 7, wherein the unique identifier of the remote entity is a certificate that is digitally signed or encrypted with a private key.

10. The method as recited in claim 7, wherein determining that the hardware profile matches at least a portion of a stored hardware profile associated with the unique identifier employs a fuzzy-logic algorithm.

11. The method as recited in claim 7, further comprising:
receiving, from the remote entity, an initial hardware profile;
storing, at the server device, the initial hardware profile as the stored hardware profile;
associating the stored hardware profile with the unique identifier; and
transmitting, prior to receiving the resource access request, the unique identifier to the remote entity for use in subsequent attempts to access the resource.

12. The method as recited in claim 7, further comprising updating, responsive to transmitting the credential to the remote entity, the frequency of credential distribution associated with the unique identifier.

13. The method as recited in claim 7, further comprising:
determining that a rate at which credentials are distributed in association with the unique identifier of the remote entity does not exceed a credential distribution rate limit associated with the unique identifier of the remote entity; and
transmit, responsive to determining that the credential distribution rate limit and the credential distribution frequency limit have not been exceeded, the credential to the remote entity.

14. The method as recited in claim 7, wherein determining that the hardware profile of the resource access request matches at least a portion of a stored hardware profile associated with the unique identifier employs a fuzzy-logic algorithm.

15. One or more computer-readable storage devices comprising processor-executable instructions that, responsive to execution by one or more processors, implement a resource access manager to:
receive, via a network interface, a resource access request from a remote entity, the resource access request received prior to the remote entity accessing a resource for which the resource access request requests access and including a unique identifier of the remote entity and a hardware profile of the remote entity, the unique identifier of the remote entity being generated in association with a secure registration process prior to receiving the resource access request;
determine that the hardware profile of the resource access request matches at least a portion of a stored hardware profile associated with the unique identifier;
determine that a frequency of credential distribution associated with the unique identifier of the remote entity does not exceed a credential distribution frequency limit associated with the unique identifier, the credential distribution frequency limit being effective to limit credentials distributed in association with the unique identifier to one credential per one interval of time; and
transmit, via the network interface and responsive to determining that the credential distribution frequency limit associated with the unique identifier of the remote entity has not been exceeded, a credential to the remote entity effective to grant the remote entity access to the resource for which the resource access request requests access.

16. The one or more computer-readable storage devices as recited in claim 15, wherein the resource access manager is further implemented to update, responsive to transmitting the credential to the remote entity, the frequency of credential distribution associated with the unique identifier.

17. The one or more computer-readable storage devices as recited in claim 15, wherein the hardware profile of the remote entity includes a collection of serial numbers, model numbers, or parameters of hardware components of the remote entity.

18. The one or more computer-readable storage devices as recited in claim 15, wherein the resource is a software product or a software update and transmitting the credential is effective to enable the remote entity to access the software product or the software update.

19. The one or more computer-readable storage devices as recited in claim 18, wherein the resource access manager is implemented on a first server device, the software product or the software update are provided by a second server device, and transmitting the credential from the first server device to the remote entity is effective to enable the remote entity to access the software product or the software update provided by the second server device.

20. The one or more computer-readable storage devices as recited in claim 15, wherein the resource access manager is further implemented to update, responsive to transmitting the credential to the remote entity, the frequency of credential distribution associated with the unique identifier.

* * * * *